INVENTOR
Henry B. Chalmers

Feb. 25, 1930. H. B. CHALMERS 1,748,108
POWER TRANSMISSION
Filed Oct. 16, 1925 2 Sheets-Sheet 2
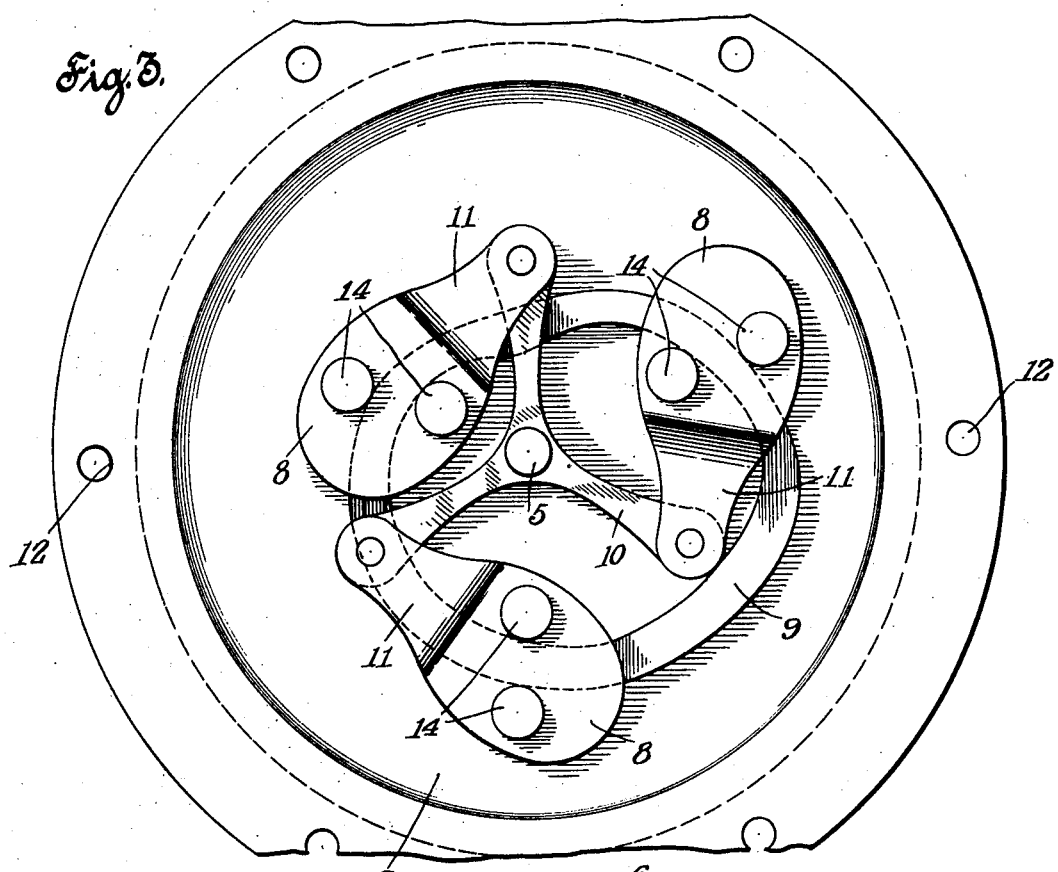
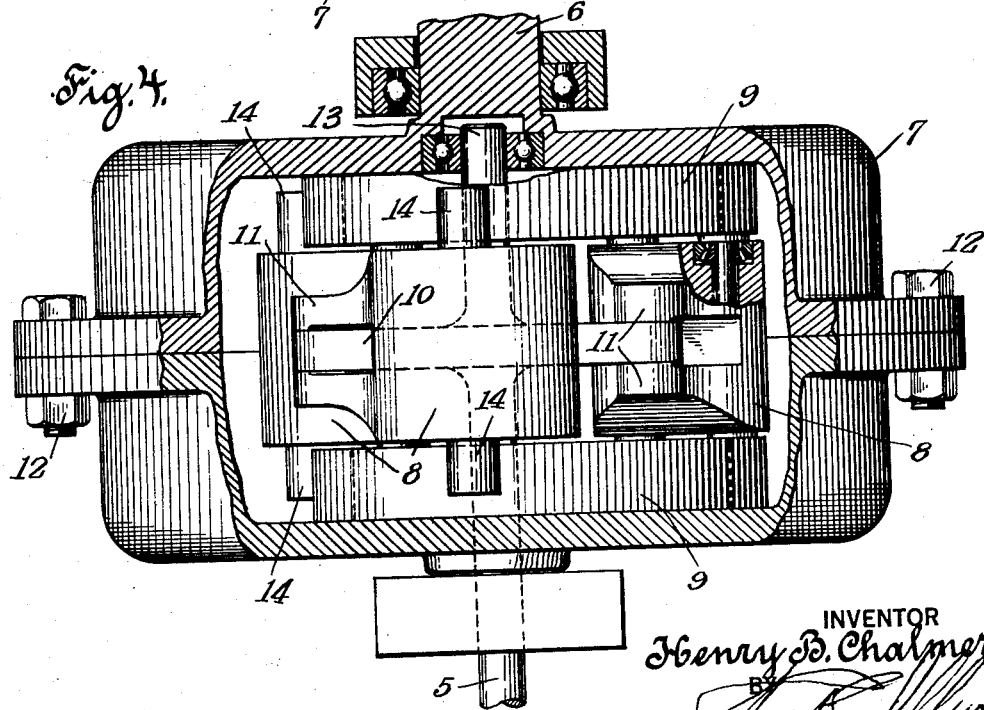
INVENTOR
Henry B. Chalmers
ATTORNEY Patented Feb. 25, 1930

1,748,108

UNITED STATES PATENT OFFICE

HARRY B. CHALMERS, OF NEW YORK, N. Y.

POWER TRANSMISSION

Application filed October 16, 1925. Serial No. 62,756.

One object of my invention is to provide mechanism by which the transmitted speed varies substantially inversely with the load at operating speeds.

Another object is to obtain an approximately uniform torque on the driven member throughout all the varying relative positions of driving and driven shafts.

Another object is to provide mechanism embodying as few parts and as simple as possible for effecting these results.

Another object is to avoid vibration as much as possible.

Such devices have many uses, such as transmission mechanism for motor vehicles, electric motor drive, the application to punch and shearing processes, lathes, and for machine tools. In fact the invention is not limited to any particular art other than power transmission in general.

In the accompanying two sheets of drawings, I have illustrated the principles of the invention as embodied in one form of mechanism and have diagrammatically illustrated the general theory of operation.

Fig. 3 is an end view of one form of mechanism embodying my invention.

Fig. 4 is a plan view and partial section of the same.

Driving and driven members 5 and 6 respectively are in alignment.

A casing or frame 7 may be employed to enclose the parts and may constitute a part of the driven member.

Figure 1:
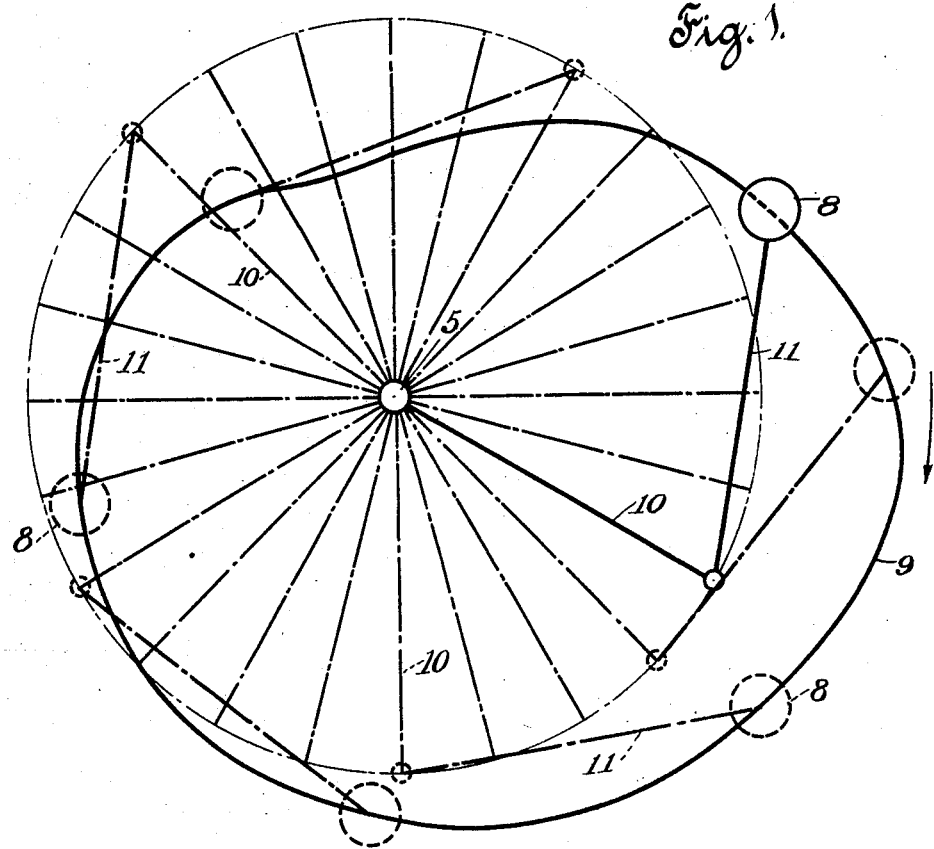
Figs. 1 and 2 are diagrammatic views showing the outline of the elements of the invention with lines indicating the relative movements of the parts.
Figure 2:
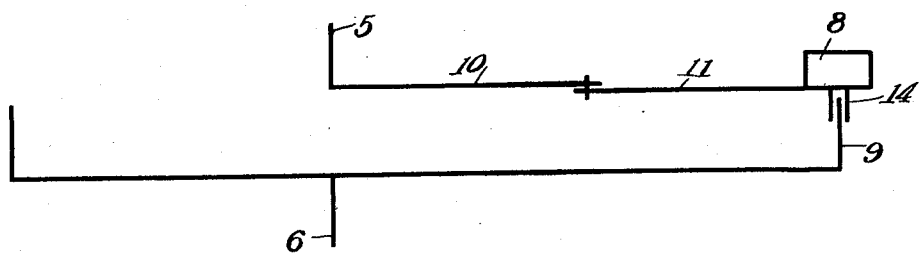

In Figs. 1 and 2 I have shown diagrammatically a mass or body 8 representing one or more of such masses to which motion is given by the driving member and which is regulated and constrained by a cam-like track indicated by the curved line 9, carried by the driven member. The mass is connected to the driving member by an arm 10 and link 11 which is hinged to the outer end of the arm. The link 11, of course, constitutes a part of the mass 8 or with substantially the same effect so far as its effect in transmission is concerned. As the shaft 5 is rotated, the arm 10 rotates with it and the mass 8 is compelled to rotate about the center of the axis 5 in a path whose direction is controlled by the track 9. In the preferred form, approximately two-thirds of the track is substantially an involute curve so that while the mass 8 rotates about the axis 5, it is gradually forced toward the axis by the decreasing radius of the involute, and its velocity is, during this period, gradually decreased from a maximum to a minimum. During this portion of the travel centrifugal force transmits a clockwise torque to the driven member.

The linear velocity of the mass 8, of course, tends to remain constant but its action is constrained not only by the surface of the cam 9 but by the links 10 and 11. If we assume the angular velocity of the crank arm 10 to be constant, the mass 8 will be guided toward and from the center of the shaft 5 as the arm rotates. As the mass decreases its distance from the center it must increase its angular velocity about that center in order to maintain its constant linear speed. This increase in angular velocity is retarded by the link 10 which is revolving at a constant angular velocity. The mass 8 is therefore pushing on the link 10 instead of being drawn by it. This produces compression in the link 11. This compression in the link 11 continues from the longest to the shortest radius of the involute groove, during which time kinetic energy of the mass is being given up or returned to the driving arm or motor.

Kinetic energy of the mass is being reduced and given up through a compression in the link 11, and a pressure against the track surface, also giving a clockwise torque to the driven member during this period of the revolution. If the driven member at this time is locked or stationary, substantially all of the difference between the kinetic energy at its maximum and minimum point is returned to or re-absorbed by the driving member or motor. The remainder of the track, in this case approximately one-third of its time of contact with the roller, is so designed as to bring the mass 8 back to its original position, direction of travel, and velocity.

The natural path of the hinged mass 8 during this period is controlled by its acceleration and consequent increasing kinetic energy balancing the centrifugal pull which would bring the mass 8 back to the involute curve much later than is desired and in a direction crossing said involute. The track is, therefore, designed to constrain the mass so that the centrifugal force is over-balanced by the inertia or resistance to acceleration to the extent that there is a continuous clockwise torque on the track and the weight meets the involute tangentially. During this portion of the revolution of the mass, its velocity is being increased, hence its kinetic energy is being increased, with a resulting heavy tension in the link 11, and the power is again withdrawn from the engine.

When the driven shaft is allowed to rotate, the acceleration and retardation of the mass become less because there is a greater time interval between the maximum and minimum velocities. For instance, if the driving shaft is running 1000 R. P. M. and the driven shaft is still, the velocity of the mass will pass from the maximum velocity to the minimum velocity and back 1000 times per minute, whereas with the driving shaft at 1000 R. P. M. and the driven shaft at 600 R. P. M. the mass will pass from maximum to minimum velocity and back only 400 times in a minute.

The difference in acceleration and retardation between the slowest and fastest points, and vice versa, and consequently the tension and compression in the links 11 is less when the driven shaft rotates, thus transmitting the same power from the driving to the driven member but less torque. The torque becomes less and less as the speed of the driven member approaches the speed of the driving member.

In the form shown in Figs. 3 and 4 the casing 7 which is a part of the driven member 6 is formed of two parts bolted together at 12. The driving member 5 passes through one side of the casing 7 and has a bearing at 13 in the opposite side.

There are in this form three masses 8 hinged to the rotating driver 10. Each mass includes the guide rollers 14 which travel outside and inside of the track 9. The track is shaped so that the masses 8 are alternately accelerated and retarded as the driving member is rotated. When one mass is absorbing energy the others are giving up the stored energy. This produces a substantially uniform torque on the driven member throughout each revolution.

Any number of masses 8 may be used.

The track 9 is preferably designed to give an acceleration and decelleration of each mass 8 at each revolution but the track may be shaped to produce two or more cycles of alternate acceleration and decelleration if desired.

I have shown two tracks 9 one on each side of the casing 7 so as to more uniformly balance the stresses.

I also contemplate that other changes may be made within the scope of my claims.

I claim:

1. Power transmission apparatus comprising a driving member, an arm driven thereby, a mass hinged to said arm, a driven member, a track connected thereto for controlling the direction of movement of said mass, said track having an involute surface extending through a part of its circumference and a connecting curve shaped so that the inertia where pulling oppositely overbalances the centrifugal force so as to cause a substantially uni-directional torque on the driven member.

2. Power transmission apparatus comprising a driving member, an arm driven thereby, a mass hinged to said arm, a driven member rotatable therewith, rollers carried by said mass and engaging said track for controlling the direction of movement of said mass, said track having its active surface shaped as a substantially involute curve with a connecting curve of a variable radius to cause a substantially uni-directional torque on the driven member throughout a complete revolution.

3. Power transmission apparatus comprising a driving member, an arm driven thereby, a mass hinged to said arm, a driven member having two tracks facing toward each other, rollers carried by said mass and engaging said tracks for controlling the direction of movement of said mass, said track having its active surface shaped as a substantially involute curve with a connecting curve of a variable radius to cause a substantially uni-directional torque on the driven member, said mass being mounted between said tracks.

4. Power transmission apparatus comprising a driving member, a driven member having a casing with two tracks, spaced apart from each other, each track having an involute curved portion with a connecting curve of a variable radius, and a mass guided by said tracks and driven by said driving member.

5. Power transmission apparatus comprising a driving member, arms driven thereby, a mass hinged to each arm, a driven member, a track connected thereto for controlling the direction of movement of all of said masses, said track having its active surface shaped to cause a substantially even uni-directional torque on the driven member throughout most of a complete revolution, said track having an involute surface extending throughout a part of its circumference, and a connecting curve shaped so that the inertia at a given point at least partially counteracts the force, tending to move the mass outwardly from the axis of the apparatus.

6. Power transmission apparatus comprising a driving member, a driven member having a casing with a curved guide track, the said track having an involute curved portion with a concave-convex connecting curved wall of a variable radius and a mass guided by said track and driven by said driving member, the shape of said track being such as to produce a substantially uni-directional torque on the driven member throughout the greater part of the complete revolution thereof.

HARRY B. CHALMERS.